(No Model.)
2 Sheets—Sheet 1.

F. G. SLEMMER.
SOLDERING MACHINE.

No. 466,580. Patented Jan. 5, 1892.

Witnesses

Inventor
Frank G. Slemmer,
By Geo. F. Whitney
Attorney (No Model.) 2 Sheets—Sheet 2.

F. G. SLEMMER.
SOLDERING MACHINE.

No. 466,580. Patented Jan. 5, 1892.

Witnesses

Inventor
Frank G. Slemmer,
By Geo. F. Whittier
Attorney

UNITED STATES PATENT OFFICE.

FRANK GETZ SLEMMER, OF MARYDELL, MARYLAND.

SOLDERING-MACHINE.

SPECIFICATION forming part of Letters Patent No. 466,580, dated January 5, 1892.

Application filed October 17, 1891. Serial No. 408,980. (No model.)

*To all whom it may concern:*

Be it known that I, FRANK GETZ SLEMMER, a citizen of the United States, residing at Marydell, in the county of Caroline and State of Maryland, have invented certain new and useful Improvements in Soldering-Machines; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to apparatus for soldering the ends to the bodies of sheet-metal cans.

The object of my invention is to simplify the construction of the apparatus, to economize in the use of solder, and to produce a neater and stronger can.

To these ends my invention consists in certain novel features hereinafter set forth, and particularly pointed out in the claims.

Figure 1:
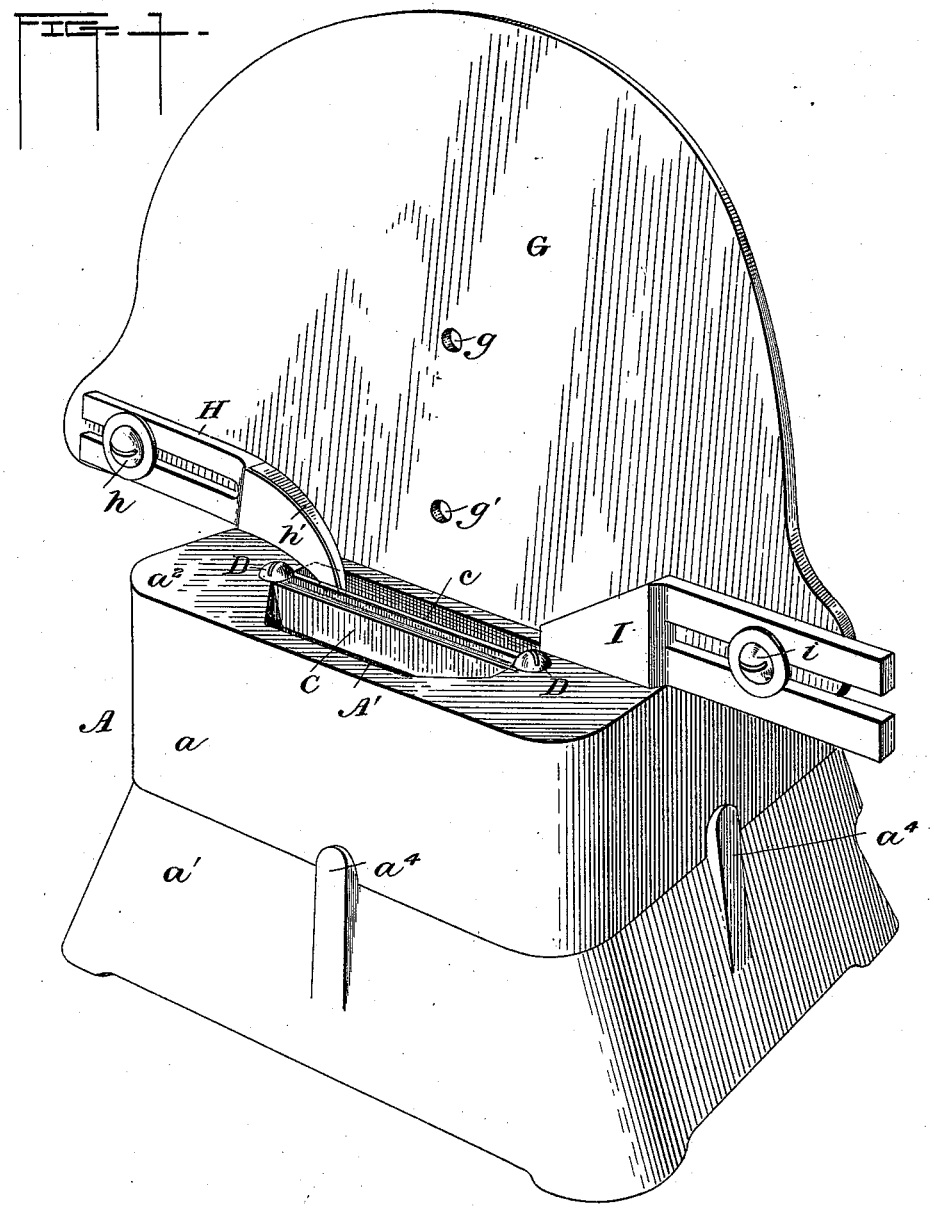
Figure 2:
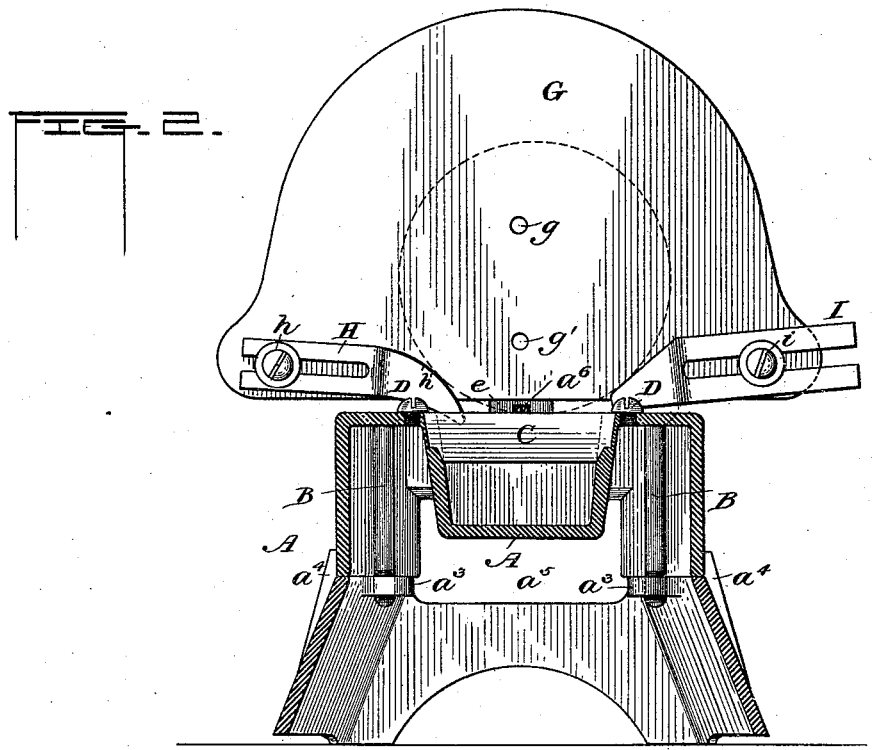
Figure 3:
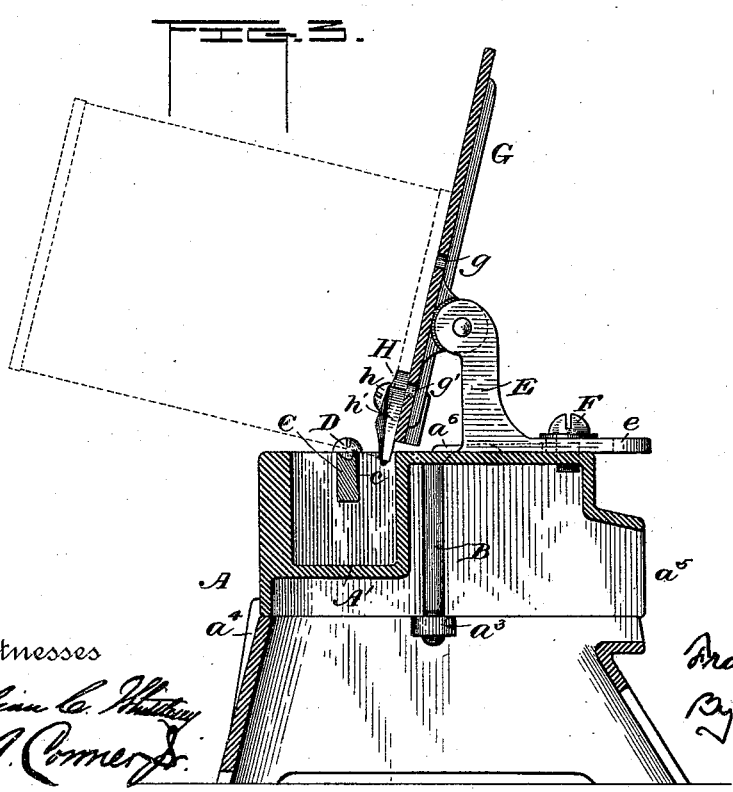

In the drawings, Figure 1 is a perspective view of my apparatus. Fig. 2 is a front elevation partly in section, and Fig. 3 is a sectional side elevation.

The base A is shown as composed of two castings $a$ $a'$, united by the vertical bolts B, whose heads are countersunk in the top plate $a^2$, and whose lower threaded ends screw into threaded holes in lugs $a^3$, formed on the lower portion of the base. The two portions are held from lateral displacement by the lugs $a^4$, extending up from the lower portion. If desired, however, the entire base may be cast in one piece. Depending from the top plate $a^2$, and preferably integral therewith, is a well A' for holding a supply of molten solder, my apparatus being what is known as a "dip-machine," in which the joint of the can is dipped into a bath of melted solder. In the back of the base A is an opening $a^5$, through which a gas-flame may be directed upon the well A'. Any other suitable mode of heating the solder may be employed. At each end of the well is a groove, and in the grooves is placed a metal bar C, preferably of steel or copper. The depth of the bar is such that it dips constantly into the solder in the well, and it is sufficiently thick to maintain a substantially even heat. Its upper edge is grooved longitudinally or otherwise shaped to form a narrow face $c$, which constitutes the soldering-surface. This face $c$ and the adjacent vertical side of the bar are tinned. A screw D is inserted into the top plate $a^2$, close to each end of the bar C, with its head overlapping the bar, which is thereby held firmly in place. To the rear of the well is a standard E, which has a slotted foot $e$, through which passes a screw F, by which the standard is adjustably clamped upon the top plate $a^2$. A rib $a^6$ on the top plate, engaging with a groove in the under side of the foot $e$, assists in guiding the standard when it is being adjusted. Hinged to the top of the standard is a back plate G, against which the can rests while being soldered. The plate is of such dimensions as to accommodate any commercial size of can, and, being hinged to an adjustable standard, can be set to properly support cans of different diameters and having various kinds and widths of joints. Two holes $g$ $g'$ are made in the back plate G, so that when the top of a can is being soldered the opening in said top is over at least one of these holes, which gives a free vent for the heated air to escape from the can, and thus prevents air-holes in the seam. The holes are so located as to accommodate any size of can from No. 2 up to No. 10.

Secured to each side of the back plate, near the lower edge thereof, is a gage H I, each of which is slotted to enable it to be adjusted by means of a set-screw $h$ $i$ passing through said slot. The working edge of one of these gages, as H, is curved, and its end dips into the solder in the well. This gage is made of steel or copper, and the curved surface $h'$ is tinned.

The manner of using my apparatus is as follows: The can to be soldered is placed with its end resting against the back plate G and its lower edge supported upon the face $c$ of the bar C. It is then revolved in the melted solder, the gages holding it in position. The tinned surfaces of the bar C and the gage H draw the solder up to the can and soak it into the seam, the surplus solder being wiped off by the gages and flowing back into the well.

Having thus described my invention, what

I claim, and desire to secure by Letters Patent, is—

1. The combination, with a solder-well A', of a stationary bar C, extending across the same and dipping into the solder, a standard adjustable toward and away from said well, a back plate hinged to said standard, and gages secured to said back plate, substantially as described.

2. A dip-soldering machine having a hinged back plate provided with gages and with vent-holes $g$ $g'$, arranged on or near the middle vertical line of the plate and adapted to register with the opening in the head of any commercial size of can when said can rests on the gages, substantially as described.

3. A dip-soldering machine provided with a hinged back plate having gages adjustably secured thereto and serving as supports for the can while it is being soldered, substantially as described.

4. A dip-soldering machine provided with a hinged back plate G, having the gage H adjustably secured thereto, said gage having a downwardly-curved end dipping into the solder-well, substantially as described.

In testimony whereof I affix my signature in presence of two witnesses.

FRANK GETZ SLEMMER.

Witnesses:
PHILAMON SCOTTON,
SAML. H. PIPPIN.